(12) United States Patent  (10) Patent No.: US 6,377,722 B1
Hoekstra  (45) Date of Patent: Apr. 23, 2002

(54) POLYMERIC PHASED ARRAY

(75) Inventor: Tjerk Hans Hoekstra, Balerno (GB)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/402,753

(22) Filed: Sep. 17, 1999

Related U.S. Application Data

(63) Continuation-in-part of application No. PCT/EP98/00544, filed on Jan. 29, 1998.
(60) Provisional application No. 60/042,345, filed on Mar. 24, 1997.

(30) Foreign Application Priority Data

Mar. 3, 1997 (EP) .............................. 97200614

(51) Int. Cl.$^7$ ................................. G02B 6/42
(52) U.S. Cl. ......................................... 385/15
(58) Field of Search ............................. 385/15, 24, 27, 385/37, 46

(56) References Cited

U.S. PATENT DOCUMENTS 5,636,300 A    6/1997   Keck et al. .................... 385/24
5,881,199 A  * 3/1999   Li .............................. 385/140
6,049,640 A  * 4/2000   Doerr .......................... 385/15
6,118,909 A  * 9/2000   Chen et al. .................... 385/15

OTHER PUBLICATIONS

Diemeer et al, "Polymeric Phased Array Wavelength Multiplexer Operating Around 1550 nm", Electronics Letters, Jun. 6, 1996.*

* cited by examiner

*Primary Examiner*—Jordan M. Schwartz
(74) *Attorney, Agent, or Firm*—Lacasse & Associates; Randy W. Lacasse; Kevin E. Greene

(57) ABSTRACT

The invention pertains to a polymeric phased array comprising an MMI input coupler with N inputs and an MMI output coupler with M outputs, N and M being natural numbers greater than or equal to 1, wherein the couplers are optically connected by means of an optical array comprising a series of optical waveguides, each of which differs from its nearest neighbour, in optical path length by a predetermined fixed amount, wherein the physical length of all the waveguides is substantially equal. The said phased arrays are less sensitive to changes in temperature and physical aging.

8 Claims, 1 Drawing Sheet

POLYMERIC PHASED ARRAY

REFERENCE TO RELATED APPLICATIONS

This application claim benefit of Provisional No. 60/042,345 filed Mar. 24, 1997 and a continuation-in-part patent application to International Patent Application No. WO 98/39676 (PCT/EP98/00544) filed Jan. 29, 1998.

BACKGROUND OF THE DRAWINGS

The invention pertains to a polymeric phased array comprising an input coupler with N inputs and an output coupler with M outputs, N and M being natural numbers greater than or equal to 1 wherein the couplers are optically connected by means of an optical array comprising a series of optical waveguides, each of which differs from a neighbour in optical path length by a predetermined fixed amount.

Phased arrays, also denoted as, e.g., "Phasars," "Array waveguide multiplexers," or "Arrayed Waveguide Gratings," manufactured of a polymeric material are known from, for instance, M. B. J. Diemeer et al., "Polymeric phased array wavelength multiplexer operating around 1550 nm," *Electronic Letters, Jun.* 6th, 1996, Vol. 32, No. 12.

This publication concerns phasars comprising curved waveguides of mutually differing physical lengths and mentions that polymeric phased arrays (i.e., phased arrays comprising a polymer core and at least one polymer (top) cladding) advantageously offer optical fiber compatibility combined with low cost and the possibility of using large substrates for the fabrication. Owing to the use of large substrates, the polymeric phased arrays can be integrated with other (polymeric) optical components, such as switches, which allows the manufacture of add/drop multiplexers capable of individual routing of the different wavelength channels.

However, an interferometric device like the polymeric phasar is very sensitive to changes in temperature and physical ageing of the polymer of which it is manufactured.

The invention has for its object to reduce or even obviate the said sensitivity. This is achieved by a polymeric phased array as described in the first paragraph wherein the physical length of all the waveguides (in the array) is substantially equal.

SUMMARY OF THE INVENTION

In accordance with an aspect of the invention, there is provided, a polymeric phased array comprising an MMI input coupler with N inputs and an MMI output coupler with M outputs, N and M being natural numbers greater than or equal to 1, wherein the couplers are optically connected by means of an optical array comprising a series of optical waveguides, each of which differs from a neighbour in optical path length, characterized in that the physical length of all the waveguides in the array is substantially equal.

Although a free space coupler is suitable, MMI couplers provide significant and advantages.

It was found that, as a result of the substantially equal lengths of the waveguides, the phenomena discussed above influence the optical path lengths of all the waveguides to (substantially) the same extent. Consequently, the differences in optical path lengths of the waveguides, on which differences the operational principle of a phased array is based, remain virtually constant, and the functioning of the phased array is effectively unaffected.

It is preferred that the maximum deviation from the average (arithmetical mean) of the physical length of the waveguides is smaller than 5 percent, preferably smaller than 1 percent or even smaller than 0.5 percent, of the said average, because with such a small deviation the central wavelength is sufficiently fixed for practical use.

In a preferred embodiment of the polymeric phased array according to the present invention the waveguides run straight. Additional advantages of a phasar comprising straight and parallel waveguides are that such a phasar is compact, has a relatively low insertion loss due to the absence of bends in the waveguides, allows economic; use of wafers, and allows a larger integration density. Also, the production of phasars is simplified because the phasars, which are densely packed on a single wafer, can be separated by means of a single and straight cut (as opposed to a complicated cut which manoeuvres between curved phasars).

The straight phasar according to the present invention is even more compact when the input coupler and 1 the output coupler are combined and the waveguides are provided with a mirror or a facet or endface that functions as a mirror. This kind of waveguide can be manufactured, for instance, by simply dividing a straight phasar up into two equal parts (by means of a cut perpendicular to the waveguides of the array) and depositing a reflective coating or mounting a mirror on the obtained endfaces.

Phasars comprising combined couplers and a mirror surface are known in themselves, e.g., from H. Okayama et al., "Reflective Waveguide Array Demultiplexer in LiNnO3," *Journal of Lightwave Technology*, Jun. 1996, Vol. 14, No. 6, pp. 985–990. From this publication it can be seen that prior art "half phasars require, besides the usual curved section, additional straight sections normal to the mirror surface in order to allow a mode confined in the waveguides to settle and avoid losses during reflection. " Consequently, the half phasar of the prior art requires its own "custom made" manufacturing process, whereas the half phasars of the invention can, as mentioned above, be manufactured by dividing up an existing specimen.

It is preferred that the polymeric phased array is a so-called planar structure. Free-space couplers are considered the most suitable couplers because of their wavelength independence. It has been found that Multi Mode Interferometers, also, denoted, as MMI couplers are the most suitable for this application.

One possible way of varying the optical path length of the waveguides whilst keeping their physical length constant consists in using different polymers having a refractive index which differs (by a predetermined fixed amount) for each of the waveguides in the array. Since this requires a large number of different (blends of) polymers and process steps, it is preferred that the waveguides comprise serial zones of different refractive indices. Thus, the optical path length of each of the waveguides is determined by the refractive indices and the lengths of the serial zones.

If a certain phasar comprises, for example, fifty waveguides of equal physical length but with the optical path length of each waveguide differing from that of its nearest neighbour(s) by a predetermined fixed amount, the waveguides may consist of, successively, a zone having a refractive index n1, a zone having a refractive index n2, and a zone having, again, a refractive index n1, with n2>n1 . By increasing the length of the zone having a refractive index n2, the optical path length is increased. Thus, the optical path length of each of the waveguides can be adjusted by varying the lengths of the different zones so as to form the required grating.

Waveguides comprising serial zones and one particular way of manufacturing them are described In more detail in T. Watanabe et al., "Novel 'serially grafted' connection between functional and passive polymer waveguides," *Appl. Phys. Lett.* 65 (10), Sep. 5, 1995. Other ways of making waveguides with the said serial zones of course are not excluded.

In another embodiment according to the present invention at least one of the waveguides comprises a polymer which allows actively induced variation of the refractive index, for instance using the thermo-optical or electro-optical principle which is well-known to the skilled person.

By using such a polymer (either over the entire length of the waveguide or in one or more zones) the central wavelength and/or the wavelength peaks in the image plane in the output free-space coupler can be adjusted during operation by powering a heating element positioned near the waveguide. In the latter instance, it is preferred that at least some of the heating elements can be individually controlled.

It is noted that EP 717 295 discloses an MxO multiplex/demultiplex device comprising optical fibers or silica waveguides which function as a grating. Although waveguides of equal length are mentioned, it is apparent from the example illustrated by FIG. 3 that equal is not to be taken literally, because evanescent coupling regions require the optical fibers to be in close contact, whereas in the grating area the optical fibers should be sufficiently far apart to avoid any interaction. To meet both these requirements, the physical lengths of the waveguides will vary considerably and are substantially unequal. At any rate, polymer waveguides are not mentioned and the underlying problems (sensitivity to both ageing and temperature variations) are not an issue in the devices according to EP 717 295, which document, consequently, has no bearing on the present invention.

In summary, the use of an MMI coupler as either splitter or combiner in a phased array configuration with equal physical arm lengths is novel and inventive. The device has been described in a U.S. Patent by M. R. Amersfoort (U.S. Pat. No. 5,862,279; Jan. 19, 1999) for the case of non-equal physical arm lengths, but no mention of equal lengths has been made. In that patent, considerable effort has been expended in meeting the arm length requirements for proper device operation, resulting in many complicated configurations involving multiple curved waveguides in the phased array.

Amersfoort's device with non-equal length arms is complicated to design, and results in a physically larger device with greater losses and polarization dependence due to the curved waveguides. Furthermore, the manufacture of the device becomes less practicable as N (number of ports) increases.

In the present patent, however, the use of equal physical arm lengths circumvents these difficulties. The phased array arm lengths can in this case always be optimal, i.e., optical path lengths differing by a monotonically increasing factor. This results in an improved spectral response and the smallest possible total length in the phased array (which leads to smaller devices with lower total losses), and without the additional loss and polarization dependence introduced by curved waveguides. The device maintains these advantages and remains simple to design even for very large N. The inherent temperature and aging compensation of the equal physical arm lengths are additional advantages. Hence the equal physical arm length phased array device using at least one MMI coupler is novel, has clear advantages. It should be noted, that by using an MMI coupler or couplers in the phased array device in accordance with the invention, fewer arms are required between the couplers. For example, in a typical phased array having free-space regions coupled by a plurality of waveguides, a great many waveguides are required to capture and carry the light from one coupler to the other; However, MMI couplers focus the light at ports thereof, and fewer waveguides can conveniently couple the focused light to their destination. Essentially, instead of haphazardly collecting the light from a free space region in a standard free space coupler with very many collectors since the light is spread out, the use of an MMI coupler allows controlled collecting of light focused at a predetermined location. Furthermore the MMI can be tunable providing control of the output light.

BRIEF DESCRPTION OF THE DRAWINGS

In the drawings

Figure 1:
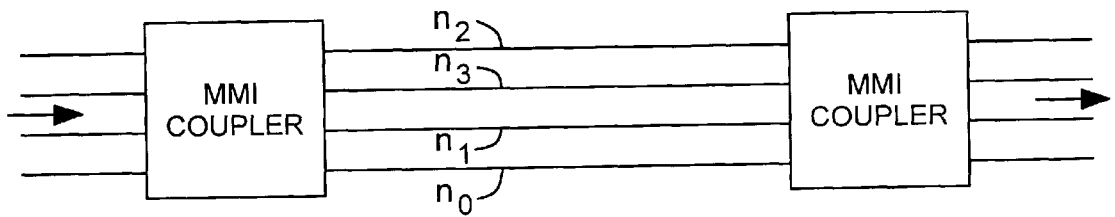
FIG. 1 is a schematic view of a phased array of the invention.
Figure 2:
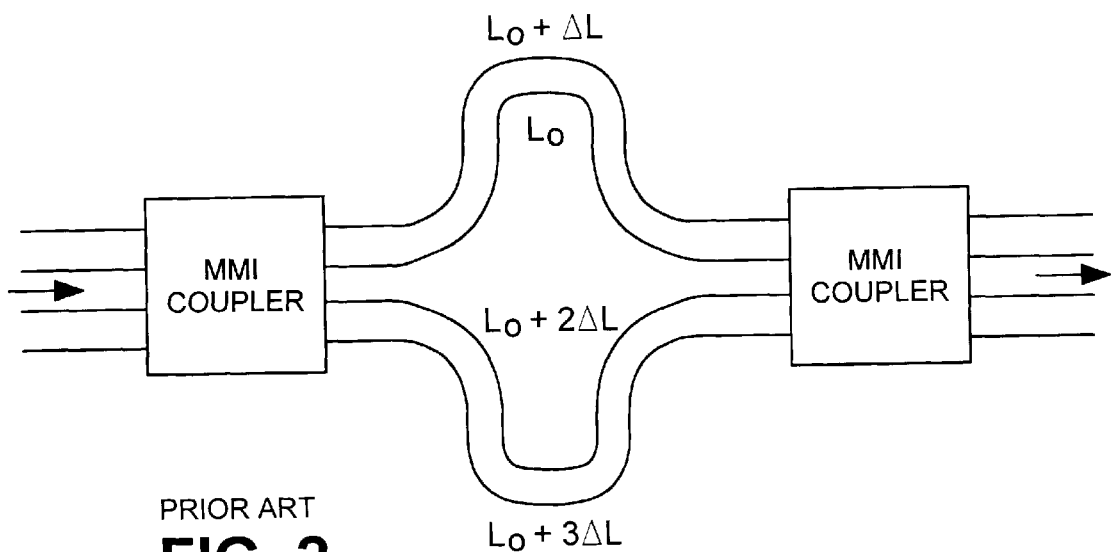
FIG. 2 is a schematic view of a prior art array.
Figure 3:
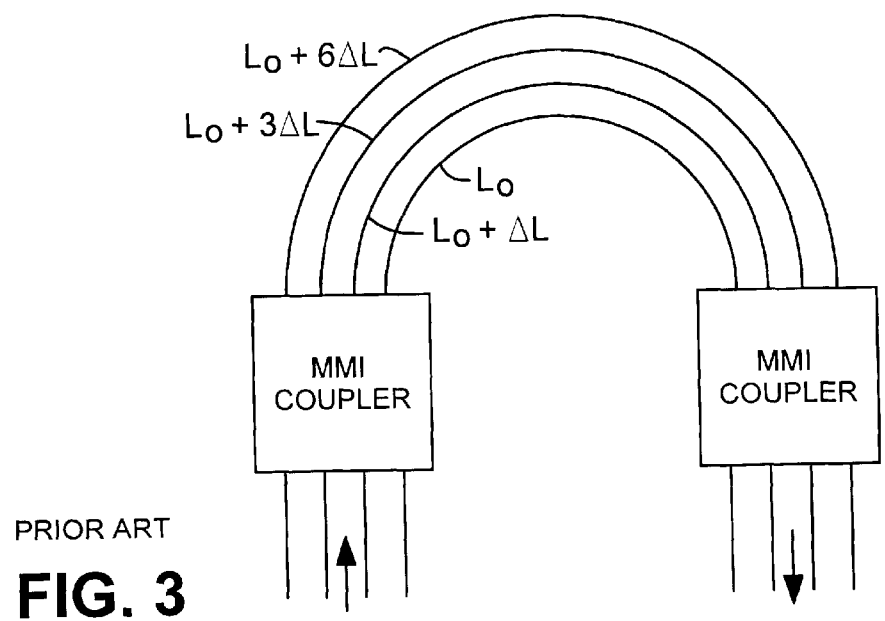
FIG. 3 is a schematic view of another prior art array design.

The figures shown relate to four-channel MMI-Phasar devices, however is applicable to an MMI-Phasar with any number of channels. In fact this method becomes more effective as the number of channels increases.

What is claimed is:

1. A polymeric phased array comprising an input coupler with N inputs and an output coupler with M outputs, N and M being natural numbers greater than or equal to 1, wherein the couplers are optically connected by means of an optical array comprising a series of optical waveguides, each of which differs from a neighbour in optical path length, characterized in that the physical length of all the waveguides in the array is substantially equal and at least one coupler is a MMI coupler.

2. A polymeric phase array according to claim 1 characterized in that the phased array is a planar structure.

3. A polymeric phased array according to claim 1 characterized in that the maximum deviation from the average physical length of the waveguides is smaller than 5 percent of the said average.

4. A polymeric Phased array according to claim 2 characterized in that the maximum deviation from the average physical length of the waveguides is smaller than 5 percent of the said average.

5. A polymeric phased array according to claim 2, characterized in that the waveguides run straight.

6. A polymeric phased array according to claim 5, characterized in that the input coupler and the output coupler are combined and at least one of the waveguides is provided with a mirror or a facet or endface that functions as a mirror.

7. A polymeric phased array according to claim 1, characterized in that at least one of the waveguides comprises at least two serial zones of different refractive indices.

8. A polymeric phased array according to claim 1, characterized in that at least one of waveguides comprises a polymer which allows actively induced variation of the refractive index.

* * * * *